US012404786B2

(12) United States Patent
Reiné

(10) Patent No.: US 12,404,786 B2
(45) Date of Patent: Sep. 2, 2025

(54) TWISTED VALVE SPRING

(71) Applicant: Honda Motor Co., Ltd., Tokyo (JP)

(72) Inventor: David Raymond Reiné, Los Angeles, CA (US)

(73) Assignee: Honda Motor Co., Ltd., Tokyo (JP)

( * ) Notice: Subject to any disclaimer, the term of this patent is extended or adjusted under 35 U.S.C. 154(b) by 435 days.

(21) Appl. No.: 18/065,490

(22) Filed: Dec. 13, 2022

(65) Prior Publication Data

US 2024/0191641 A1 Jun. 13, 2024

(51) Int. Cl.
*F16F 1/04* (2006.01)
*F01L 1/46* (2006.01)

(52) U.S. Cl.
CPC .............. *F01L 1/462* (2013.01); *F16F 1/047* (2013.01); *F16K 2200/305* (2021.08)

(58) Field of Classification Search
CPC .. F01L 1/462; F16F 1/042; F16F 1/043; F16F 1/047; F16F 1/06; F16K 2200/305
See application file for complete search history.

(56) References Cited

U.S. PATENT DOCUMENTS

| 231,150 | A | * | 8/1880 | Cliff ........................ | F16F 1/043 |
| | | | | | 267/180 |
| 4,810,231 | A | * | 3/1989 | Weissenberger ........ | F16F 1/043 |
| | | | | | 464/68.4 |
| 6,193,225 | B1 | * | 2/2001 | Watanabe ................ | F16F 1/043 |
| | | | | | 267/248 |
| 7,832,422 | B2 | | 11/2010 | Endoh et al. | |
| D652,234 | S | * | 1/2012 | DeMoss ..................... | D6/718.31 |
| 10,995,811 | B2 | * | 5/2021 | Watanabe ................. | F16F 1/06 |
| 11,719,298 | B2 | * | 8/2023 | Kishihara ................. | F16F 1/06 |
| | | | | | 267/166 |
| 11,821,485 | B1 | * | 11/2023 | Nishizawa ............... | F16F 1/08 |
| 11,940,031 | B2 | * | 3/2024 | Nishizawa .............. | F16F 1/043 |
| 2007/0235915 | A1 | * | 10/2007 | Ahn ...................... | A47C 27/056 |
| | | | | | 267/167 |
| 2019/0113094 | A1 | * | 4/2019 | Watanabe ................ | F16F 1/047 |
| 2021/0324930 | A1 | * | 10/2021 | Kishihara ................. | F16F 1/06 |
| 2022/0178415 | A1 | * | 6/2022 | Nishizawa .............. | F16F 1/043 |
| 2024/0066936 | A1 | * | 2/2024 | Nishizawa ............. | B60G 11/14 |

FOREIGN PATENT DOCUMENTS

| CN | 201401201 Y | 2/2010 |
| CN | 202250285 U | 5/2012 |
| CN | 103185097 A | 7/2013 |
| CN | 105020308 A | 11/2015 |
| CN | 204900008 U | 12/2015 |
| CN | 215334101 U | 12/2021 |
| DE | 102009060231 B4 | 4/2021 |
| WO | 2006015897 A1 | 2/2006 |

* cited by examiner

*Primary Examiner* — Thomas W Irvin
(74) *Attorney, Agent, or Firm* — Mark Duell; American Honda Motor Co., Inc.

(57) ABSTRACT

A valve spring is provided. The valve spring may include a first turn. The first turn of the valve spring may be disposed at a first angular orientation. The valve spring may further include a second turn. The second turn may be disposed at a second angular orientation. The second angular orientation may be different from the first angular orientation.

19 Claims, 4 Drawing Sheets

TWISTED VALVE SPRING

BACKGROUND

Valve springs may be generally used to control a fluid flow (such as an airflow, a gasoline flow, or a combination of both) in a machine (such as an engine). For example, the valve springs may be coupled with valves, to releasably engage the valves with ports (such as inlet and outlet ports) of the machine and control the fluid flow in the machine. The valve springs may typically have a circular cross-section with a specific coil spacing between each coil of the valve spring. In certain cases, the valve spring may reach its resonant frequency and starts to fluctuate between the valve and the port of the machine, which may lead to a spring failure. In such cases, in addition to a primary valve spring, the machine may require a supplementary valve spring (such as, a concentric spring surrounding the main valve spring) between the valve and the port of the machine, with different dimension to maintain the fluctuations and the subsequent spring failure. However, due to a friction between the primary valve spring and the supplementary valve spring, there may be increased wear between the valves and the ports of the machine. Further, such supplementary valve spring may also lead to an increased manufacturing cost of the machine.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An exemplary aspect of the disclosure provides a valve spring. The valve spring may include a first turn. The first turn of the valve spring may be disposed at a first angular orientation. The valve spring may further include a second turn. The second turn may be disposed at a second angular orientation. The second angular orientation may be different from the first angular orientation.

Another exemplary aspect of the disclosure provides a valve spring. The valve spring may include a plurality of helical turns that may include a first turn and a second turn. The first turn may be disposed at a first angular orientation and the second turn may be disposed at a second angular orientation. The second angular orientation is different from the first angular orientation.

Another exemplary aspect of the disclosure provides a method to form a valve spring. The method may include forming a first turn of a valve spring at a first angular orientation. The method may further include forming a second turn of the valve spring at a second angular orientation. The second angular orientation may be different from the first angular orientation. The second turn of the valve spring may include a part that may be in contact with a part of the first turn of the valve spring.

This summary is provided to introduce a selection of concepts in a simplified form that are further disclosed in the detailed description of the present disclosure. This summary is not intended to identify key or essential inventive concepts of the claimed subject matter, nor is it intended for determining the scope of the claimed subject matter.

Figure 1A:
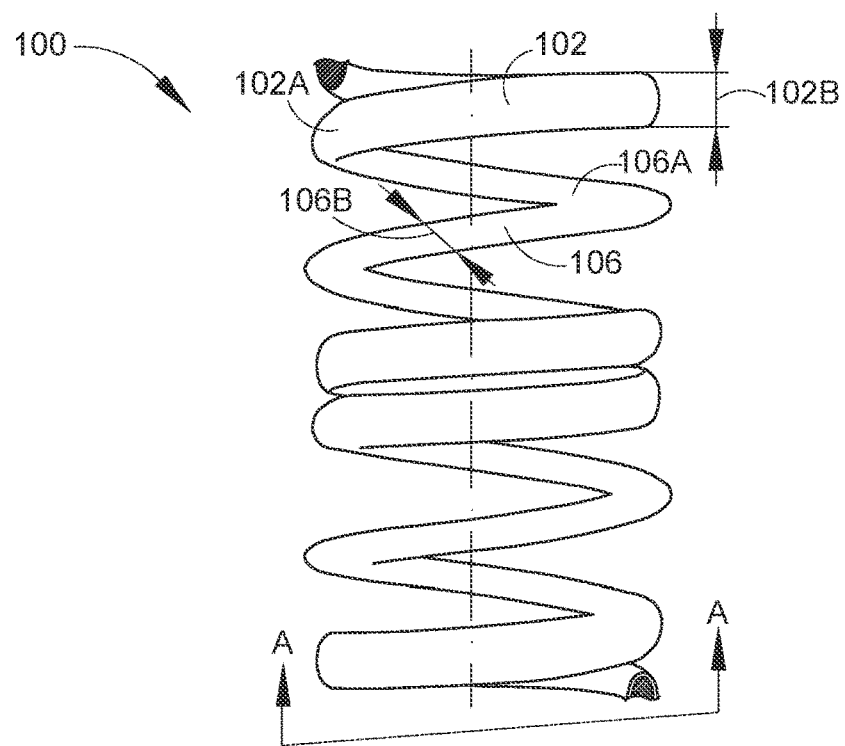
FIGS. 1A and 1B are diagrams that illustrate an exemplary valve spring, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may provide a valve spring, for example, a valve spring disposed between valves and ports of a machine (such as an engine), to control a movement of the valves of the machine. The valve spring may include a first turn, which may be disposed at a first angular orientation. The first angular orientation may facilitate the first turn to be formed with a minimal flexibility ratio. Hence, in case of reverberations due to an impact load on the valve spring, the first turn may absorb such impact load with minimal fluctuations in the movement of the valves of the machine.

The valve spring may further include a second turn. The second turn may be disposed at a second angular orientation. The second angular orientation may be different from the first angular orientation. The second angular orientation may facilitate the second turn to be formed with an increased flexibility ratio compared to the first turn. Hence, in case the first turn reaches its resonant frequency and starts to fluctuate between the valve and the port of the machine, the second turn may absorb such fluctuations of the first turn and further minimize fluctuations in the movement of the valves of the machine.

Thus, based on a varied flexibility ratio in each turns of the valve spring, the valve spring may effectively minimize the fluctuations of the valves of the machine and subsequently facilitate an optimal target strength for the valves of the machine. Further, as the first turn and the second turn are integrally coupled to form the valve spring, there is no requirement of multiple springs between the valves and the ports of the machine, which may reduce wear in the machine. Further, as the first turn and the second turn of the valve spring are manufactured as a single unit, the manufacturing cost of the valve spring may also be substantially reduced.

Reference will now be made in detail to specific aspects or features, examples of which are illustrated in the accompanying drawings. Wherever possible, corresponding, or similar reference numbers will be used throughout the drawings to refer to the same or corresponding parts.

Figure 1B:
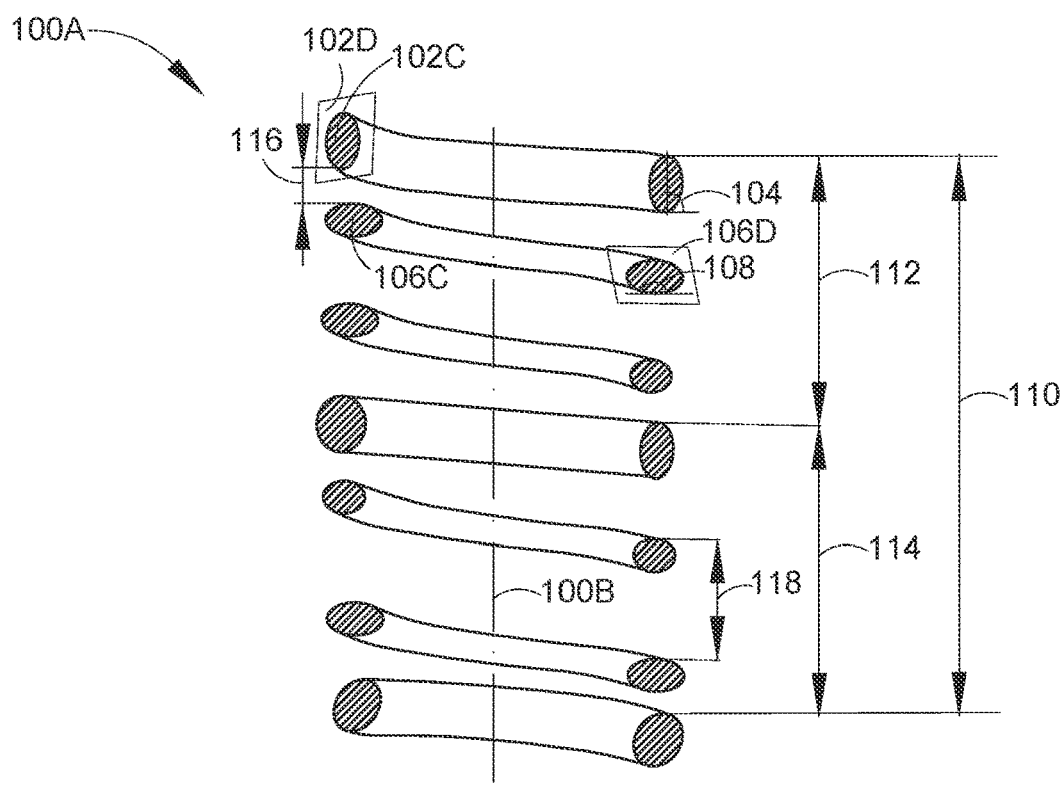

FIGS. 1A and 1B are diagrams that illustrate an exemplary valve spring, in accordance with an embodiment of the disclosure. With reference to FIG. 1A, there is shown an exemplary view of a valve spring 100. The valve spring 100 may include a first turn 102 that may be disposed at a first angular orientation 104, a second turn 106 that may be disposed in a second angular orientation 108. There is also shown an exemplary cross sectional view 100A of the valve spring 100 along section A-A, in accordance with an embodiment of the disclosure.

The valve spring 100 may be disposed between valves and ports of a machine, to control a movement of the valves within the ports of the machine. For example, the machine may be an engine (not shown) and the valve spring 100 may be disposed between valves (such as inlet valves or exhaust valves, not shown) and ports (such as inlet ports or exhaust ports) of the engine, to control the movement of the valves within the ports of the engine. The valve spring 100 is typically located on an engine head (not shown) of the engine. In an example, the valve spring 100 may be disposed between a valve seat (not shown) and a valve tip (not shown) of the valve disposed on the engine head. When activated (for example, via a camshaft), the valve spring 100 may be compressed and activates the valve, which forms an opening between the valve and the port of the engine head. When deactivated (for example, via the camshaft), the valve spring 100 may be relaxed and deactivates the valve, which closes the opening between the valve and the port of the engine head. In certain cases, the valve spring 100 may have an outside diameter in a range from 10 mm to 50 mm. In other cases, the valve spring 100 has a wire diameter in a range from 1.5 mm to 5 mm. In yet other cases, based on a change in the outside diameter or a change in the wire diameter of the valve spring 100, there may a significant change in at least one of: a flexibility ratio of the valve spring 100, a target strength of the valve spring 100, or an installation pressure of the valve spring 100.

The valve spring 100 may typically has a helical structure, which encloses a valve stem (not shown) of the valve. Based on the helical structure, the valve spring 100 may uniformly receive the load and transfer the received load to control the valve of the engine head. In an embodiment, there may be a plurality of valve springs, which may be arranged in series on the engine head. Each valve spring may be configured to selectively activate each valve of the plurality of valve springs, based on a firing order of the engine. Examples of the valve springs may include, but not limited to, a single spring, a beehive spring, a conical spring, a dual spring, or a triple spring.

The first turn 102 of the valve spring 100 may be configured to receive the load from the camshaft of the engine. For example, the first turn 102 of the valve spring 100 may receive the load from a follower component, which is associated with the camshaft of the engine. Based on an activation of the follower component, the first turn 102 may receive the load and transfer the received load to the second turn 106. In an embodiment, the first turn 102 may be located at a proximal end of the valve spring 100. The first turn 102 may have a substantially spiral structure, which may uniformly receive the load from the follower component and transfer the received load to the second turn 106, to control the valve of the engine head.

The first turn 102 of the valve spring 100 may absorb the received load, based on dimensional requirements of the first turn 102. For example, the first turn 102 may have at least a first part 102A that has a first dimension 102B. In an embodiment, a change in the first dimension 102B may facilitate a change in the flexibility ratio of the valve spring 100. In one example, if there is a user requirement for an increased flexibility ratio, the first dimension 102B may include a minimal size. In another example, if there is the user requirement for a minimal flexibility ratio, the first dimension 102B may be include a maximum size. Thus, based on the user requirements, a suitable size may be selected as the first dimension 102B. Details of the dimensional requirements of the first turn 102 is further described, for example, in FIG. 2.

In an embodiment, the first turn 102 may be formed as a first shape 102C (shown in FIG. 1B). Such first turn 102 may be located in a first plane 102D (shown in FIG. 1B). In an embodiment, a change in the first shape 102C may facilitate a change in the flexibility ratio of the valve spring 100. In one example, if there is the user requirement for the increased flexibility ratio, the first shape 102C may be formed as a substantially oval shape. In another example, if there is the user requirement for an optimal flexibility ratio, the first shape 102C may be formed as a substantially elliptical shape. Thus, based on the user requirements, a suitable shape may be selected as the first shape 102C. Examples of such suitable shape may include, but not limited to, a substantially circular shape, a substantially oval shape, a substantially elliptical shape, etc. Details of shape requirements of the first turn 102 is further described, for example, in FIG. 2.

In another embodiment, the first turn 102 may be disposed at a first angular orientation 104 (shown in FIG. 1B). In an embodiment, a change in the first angular orientation 104 may facilitate a change in the flexibility ratio of the valve spring 100. In one example, if there is the user requirement for the increased flexibility ratio, the first shape 102C of the first turn 102 may be orientated at a substantially horizontal configuration (such as between 150-180 degrees). In another example, if there is the user requirement for an optimal flexibility ratio, the first shape 102C of the first turn 102 may be oriented at a substantially vertical configuration (such as between 45-90 degrees). Thus, based on the user requirements, a suitable shape may be selected as the first shape 102C. Details of angular requirements of the first turn 102 is further described, for example, in FIG. 2.

In case of reverberations due to a fatigue load and an impact load on the valve spring 100, the first turn 102 may be configured to absorb such fatigue load the impact load, based on at least one of: the first dimension 102B, the first shape 102C or the first angular orientation 104 of the first turn 102, to form minimal fluctuations in the movement of the valves of the machine.

In an embodiment, the second turn 106 of the valve spring 100 may be located adjacent to the first turn 102, such that, a part of the second turn 106 is in contact with a part of the first turn 102. In an embodiment, the second turn 106 may be configured to receive the load from the first turn 102 of the valve spring 100. For example, the second turn 106 may include a second part 106A (shown in FIG. 1A) that may be in contact with the first part 102A of the first turn 102, to receive the load from the first turn 102 of the valve spring 100. In an embodiment, the second turn 106 may be located at a distal end of the valve spring 100. The second turn 106 may have a substantially spiral structure, which may uniformly receive the load from the first turn 102 and transfer the received load to the valve seat, to control the valve of the engine head.

In another embodiment, the second turn 106 of the valve spring 100 may be spaced from the first turn 102, such that, a part of the second turn 106 is disposed at a first distance 116 (shown in FIG. 1B) from a part of the first turn 102. In an embodiment, the second turn 106 may be configured to receive the load from the first turn 102 of the valve spring 100, via a connecting element located at the first distance 116. For example, the second turn 106 may include the second part 106A that may be disposed at the first distance 116 from the first part 102A and may receive the load via the connecting element disposed between the first part 102A and the second part 106A.

The second turn 106 of the valve spring 100 may absorb the received load, based on dimensional requirements of the second turn 106. For example, the second turn 106 may have at least the second part 106A that has a second dimension 106B. In certain cases, the second dimension 106B may be substantially same as the first dimension 102B. In other cases, the second dimension 108B may be substantially different than the first dimension 102B. In an embodiment, a change in the second dimension 106B may facilitate a change in the flexibility ratio of the valve spring 100. In one example, if there is the user requirement for an increased flexibility ratio, the second dimension 106B may include a minimal size. In another example, if there is the user requirement for a minimal flexibility ratio, the second dimension 106B may include a maximum size. Thus, based on the user requirements, a suitable size may be selected as the second dimension 106B. Details of the dimensional requirements of the second turn 106 is further described, for example, in FIG. 2.

In an embodiment, the second turn 106 may be formed as a second shape 106C (shown in FIG. 1B). The second turn 106 may be located in a second plane 106D (shown in FIG. 1B). In an example, the second plane 106D may be substantially perpendicular to the first plane 102D. In another example, the second plane 106D may be disposed at an angle that may be different from an angle of the first plane 102D. In an embodiment, a change in the second shape 106C may facilitate a change in the flexibility ratio of the valve spring 100. For example, if there is the user requirement for the increased flexibility ratio, the second shape 106C may be formed as a substantially oval shape. In another example, if there is the user requirement for an optimal flexibility ratio, the second shape 106C may be formed as a substantially elliptical shape. Thus, based on the user requirements, a suitable shape may be selected as the second shape 106C. Examples of such suitable shape may include, but not limited to, a substantially circular shape, a substantially oval shape, a substantially elliptical shape, etc. Details of shape requirements of the second turn 106 is further described, for example, in FIG. 2.

In another embodiment, the second shape 106C of the second turn 106 may be disposed at a second angular orientation 108 (shown in FIG. 1B). In an embodiment, a change in the second angular orientation 108 of the second shape 106C may facilitate a change in the flexibility ratio of the valve spring 100. In one example, if there is the user requirement for the increased flexibility ratio, the second shape 106C of the second turn 106 may be orientated at a substantially horizontal configuration (such as between 150-180 degrees). In another example, if there is the user requirement for an optimal flexibility ratio, the second shape 106C of the second turn 106 may be oriented at a substantially vertical configuration (such as between 45-90 degrees). Thus, based on the user requirements, a suitable shape may be selected as the second shape 106C of the second turn 106. Details of angular requirements of the second turn 106 is further described, for example, in FIG. 2.

Therefore, in case of reverberations due to the fatigue load and the impact load on the valve spring 100, the second turn 106 may be configured to absorb such fatigue load and the impact load from the first turn 102, based on at least one of: the second dimension 106B, the second shape 106C or the second angular orientation 108, to form minimal fluctuations in the movement of the valves of the machine. In an embodiment, the first turn 102 and the second turn 106 of the valve spring 100 may be helically wounded along a first axis 100B during a manufacturing process of the valve spring 100. Examples of the manufacturing process may include, but not limited to, a cold winding process or a hot winding process. Details of such manufacturing process are omitted from the disclosure for the sake of brevity.

In the manufacturing process, the valve spring 100 is made by a manufacturing process, which include: forming the first turn 102 of the valve spring 100 with the first part 102A at the first angular orientation 104; and forming the second turn 106 of the valve spring 100 with second part 106A that is in contact with the first part 102A of the first turn 102 of the valve spring 100. The second part is formed at the second angular orientation 108. In an embodiment, the second angular orientation 108 is different from the first angular orientation 104.

In operation, the first turn 102 of the valve spring 100 may receive the load from the camshaft (via the follower). Based on the reception of the load via at least one of: the first dimension 102B, the first shape 102C or the first angular orientation 104 of the first turn 102, at least the first part 102A of the first turn 102 may transfer the received load to at least the second part 106A of the second turn 106. Based on the reception of the load via at least one of: the second dimension 106B, the second shape 106C or the second angular orientation 108 of the second turn 106, the second turn 106 of the valve spring 100 may optimally transfer the load to the valve seat of the valve without any fluctuations, to effectively control the movement of the valve in the engine.

In another embodiment, in FIG. 1B, there is shown a plurality of helical turns 110 that may include the first turn 102 and the second turn 106. The first turn 102 may be disposed at the first angular orientation 104 and the second turn 106 may be disposed at the second angular orientation 108. In an embodiment, the second angular orientation 108 may be different from the first angular orientation 104. Details of different angular orientations of the valve spring 100 are further described, for example, in FIG. 2. In another embodiment, the second angular orientation 108 may be same as the first angular orientation 104. Details of the same angular orientation of the valve spring 100 are further described, for example, in FIG. 3.

In yet another embodiment, each turn of the plurality of helical turns 110 may be sequentially arranged as a plurality of individual groups to form a pattern. For example, each turn of the plurality of helical turns 110 may be grouped in pairs with a gap between two subsequent turns, it may form the pattern. Similarly, based on user requirements, there may be a variety of grouping of turns of the plurality of helical turns 110 and subsequent gap between such grouping that may form the pattern. In an example, there is shown a first set of turns 112 (shown in FIG. 1B) of the plurality of helical turns 110 that may form a first group and a second set of turns 114 (shown in FIG. 1B) of the plurality of helical turns 110 that may form a second group. In an example, each turn of the first set of turns 112 of the first group may be separated by a first distance 116 (shown in FIG. 1B). In another example, each turn of second set of turns 114 of the second group may be separated by a second distance 118 (shown in FIG. 1B). In some cases, the first distance 116 may be different from the second distance 118. In other cases, the first distance 116 may be same as the second distance 118. Details of the first distance 116 and the second distance 118 are further described, for example, at FIG. 2.

Figure 2:
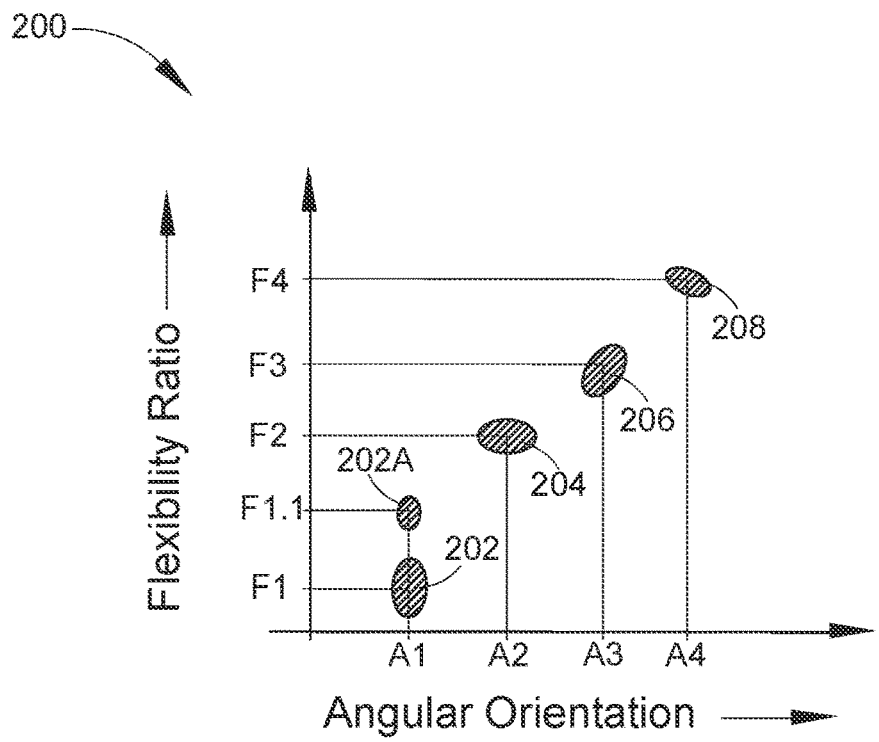
FIG. 2 is a chart that illustrates a first exemplary correspondence between a flexibility ratio and an angular orientation of the valve spring shown in FIGS. 1A and 1B, in accordance with an embodiment of the disclosure.

FIG. 2 is a chart that illustrates a first exemplary correspondence between a flexibility ratio and an angular orientation of the valve spring shown in FIGS. 1A and 1B, in accordance with an embodiment of the disclosure. FIG. 2 is explained in conjunction with elements from FIGS. 1A and 1B. With reference to FIG. 2, there is shown a chart 200 that illustrates the first exemplary correspondence between a flexibility ratio "F" and an angular orientation "A" of the valve spring 100. For example, the angular orientation "A" of the valve spring 100 is depicted along the X-axis and the corresponding flexibility ratio "F" of the valve spring 100 is depicted along the Y-axis.

Referring to the chart 200, there is shown a first shape 202 of the first turn 102 of the valve spring 100. The first turn 102 may be disposed at a first angular orientation "A1". Based on the first shape 202 and the first angular orientation "A1", the first turn 102 may be set with a first flexibility ratio "F1". For example, the first shape 202 may include a substantially elliptical shape and the first angular orientation "A1" may include a substantially vertical configuration (such as between 45-90 degrees). Based on the substantially elliptical shape and the substantially vertical configuration of the first turn 102, the first turn 102 may be set with the first flexibility ratio "F1". It may be noted that the first angular orientation "A1" shown in FIG. 2 is merely an example. The first turn 102 may include any other angular orientation at a range from 1 degree to 360 degrees.

In an embodiment, based on a change in the dimension of the first shape 202, the first turn 102 may have an increased flexibility ratio "F1.1". For example, if the first turn 102 is shaped to the substantially elliptical shape at a first dimension in the first angular configuration "A1", the first turn 102 may have the first flexibility ratio "F1". If the first turn 102 is shaped to a substantially elliptical shape 202A at a second dimension (which is lesser than the first dimension) in the first angular configuration "A1", the first turn 102 may have the increased flexibility ratio "F1.1". It may be noted that the first shape 202 shown in FIG. 2 is merely an example. The first turn 102 may include any other shape, such as, but not limited to, a substantially oval shape, a substantially polygonal shape, etc.

Further referring to the chart 200, there is shown a second shape 204 of the second turn 106 of the valve spring 100. The second turn 106 may be disposed at a second angular orientation "A2". Based on the second shape 204 and the second angular orientation "A2", the second turn 106 may be set with a second flexibility ratio "F2". For example, the second shape 204 may include a substantially elliptical shape and the first angular orientation "A2" may include a substantially horizontal configuration (such as between 150-180 degrees). Based on the substantially elliptical shape and the substantially horizontal configuration of the second turn 106, the second turn 106 may be set with the second flexibility ratio "F2". It may be noted that the second angular orientation "A2" shown in FIG. 2 is merely an example. The second turn 106 may include any other angular orientation at a range from 1 degree to 360 degrees. Further, it may be noted that the second shape 204 shown in FIG. 2 is merely an example. The second turn 106 may include any other dimension (similar to the substantially elliptical shape 202A) or any other shape, such as, but not limited to, a substantially oval shape, a substantially polygonal shape, etc.

In an embodiment, the first shape 202 of the first turn 102 may be different from the second shape 204 of the second turn 106. Further, it may be observed that, based on a change in shape between the first turn 102 and the second turn 106, the first flexibility ratio "F1" of the first turn 102 may also be different from the second flexibility ratio "F2" of the second turn 106 as shown in FIG. 2.

In certain cases, the valve spring 100 may also include a third turn and a fourth turn that may be formed as a third shape 206 at a third angular configuration "A3" and a fourth shape 208 at a fourth angular configuration "A4", respectively. Based on the third shape 206 and the third angular configuration "A3", the third turn of the valve spring 100 may be formed with a third flexibility ratio "F3". Further, based on the fourth shape 208 and the fourth angular configuration "A4", the fourth turn of the valve spring 100 may be formed with a fourth flexibility ratio "F4". In certain cases, the third flexibility ratio "F3" of the third turn may also be different from the fourth flexibility ratio "F4" of the fourth turn as shown in FIG. 2. Thus, based on a varied flexibility ratio in each turns of the valve spring 100, the valve spring 100 may effectively minimize the fluctuations of the valves of the machine and subsequently facilitate an optimal target strength for the valves of the machine.

In another embodiment, the valve spring 100 may set the flexibility ratio "F" only based on the angular orientation "A" and not based on a combination of the shape of the turns of the valve spring 100 and the angular orientation "A" of the turns of the valve spring 100. For example, the first turn 102 has the first flexibility ratio "F1", which may be set only based on the first angular orientation "A1" of the first turn 102. In another example, the second turn 106 may have the second flexibility ratio "F2", which may be set only based on the second angular orientation "A2" of the second turn 106. In such a case, the first flexibility ratio "F1" may be different from the second flexibility ratio "F2".

Figure 3:
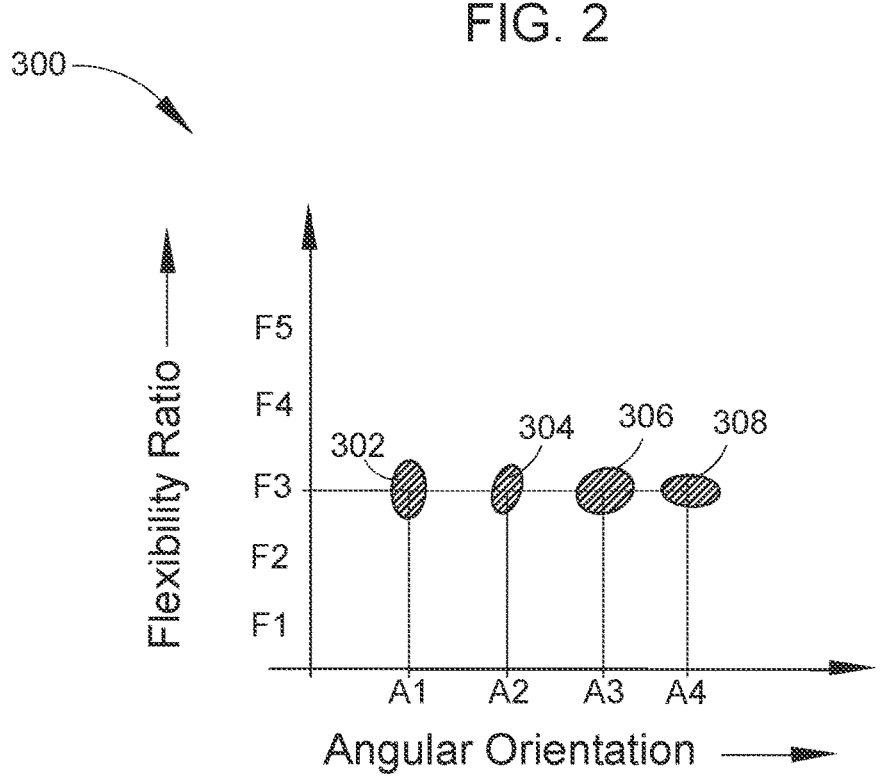
FIG. 3 is a chart that illustrates a second exemplary correspondence between a flexibility ratio and an angular orientation of the valve spring shown in FIGS. 1A and 1B, in accordance with an embodiment of the disclosure.

FIG. 3 is a chart that illustrates a second exemplary correspondence between a flexibility ratio and an angular orientation of the valve spring shown in FIGS. 1A and 1B, in accordance with an embodiment of the disclosure. FIG. 3 is explained in conjunction with elements from FIGS. 1A-1B and FIG. 2. With reference to FIG. 3, there is shown a chart 300 that illustrates the second exemplary correspondence between the flexibility ratio "F" and the angular orientation "A" of the valve spring 100. For example, the angular orientation "A" of the valve spring 100 is depicted along the X-axis and the corresponding flexibility ratio "F" of the valve spring 100 is depicted along the Y-axis.

Referring to the chart 300, there is shown the first turn 102 with a first flexibility ratio "F3", which may be set based on a first shape 302 and a first angular orientation "A1" of the first turn 102. There is also shown the second turn 106 with a second flexibility ratio "F3", which may be set based on a second shape 304 and a second angular orientation "A2" of the second turn 106. In certain cases, the first flexibility ratio "F3" may be same as the second flexibility ratio "F3".

Similarly, the valve spring 100 may further include a third turn with a third flexibility ratio "F3", which may be set based on a third shape 306 and a third angular orientation "A3" of the third turn. The valve spring 100 may also include a fourth turn with a fourth flexibility ratio "F3", which may be set based on a fourth shape 308 and a fourth angular orientation "A4" of the fourth turn. In certain cases, the third flexibility ratio "F3" may be same as the fourth flexibility ratio "F3". Hence, despite there is a change in the angular orientation "A" of each turn of the valve spring 100, as the shape of each turn also varies, the flexibility ratio "F" may be maintained as constant. In an alternative embodiment, based on user requirements, the first shape 302 of the first turn 102 may be set as same as the second shape 304 of the second turn 106. In such cases, if there is a variation in the angular orientation "A", there may be a change in the flexibility ratio "F".

Figure 4:
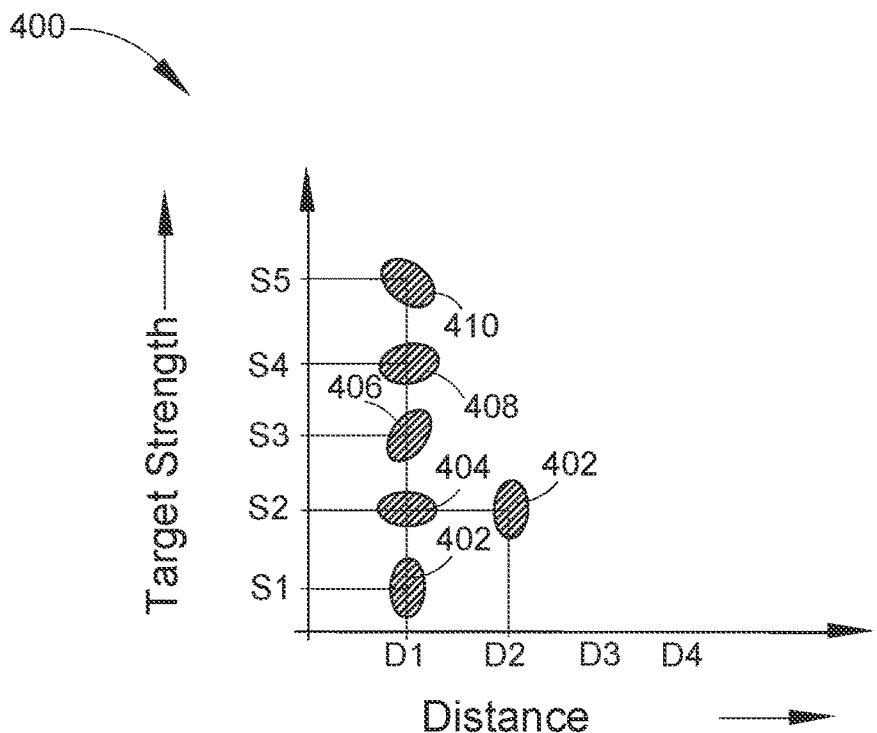
FIG. 4 is a chart that illustrates a third exemplary correspondence between a target strength and a distance between turns of the valve spring shown in FIGS. 1A and 1B, in accordance with an embodiment of the disclosure.

FIG. 4 is a chart that illustrates a third exemplary correspondence between a target strength and a distance between turns of the valve spring shown in FIGS. 1A and 1B, in accordance with an embodiment of the disclosure. FIG. 4 is explained in conjunction with elements from FIGS. 1A-1B, FIG. 2, and FIG. 3. With reference to FIG. 4, there is shown a chart 400 that illustrates the third exemplary correspondence between a target strength "S" and a distance "D" between turns (such as the first turn 102 or the second turn 106) of the valve spring 100. For example, the distance "D" between turns of the valve spring 100 is depicted along the X-axis and the corresponding the target strength "S" of the valve spring 100 is depicted along the Y-axis.

Referring to the chart 400, there is shown a first shape 402 of the first turn 102 of the valve spring 100. The first turn 102 may be disposed at a first distance "D1". Based on the first shape 402 and the first distance "D1", the first turn 102 may be set with a first target strength "S1". For example, the first shape 202 may include a substantially elliptical shape and the first distance "D1" in a range from "0.1" mm to "3.0" mm. Based on the substantially elliptical shape and the first distance "D1" of the first turn 102, the first turn 102 may be set with the first target strength "S1". It may be noted that the first distance "D1" shown in FIG. 4 is merely an example. The first turn 102 may be disposed at any other distance, for example, at a range from "0.1" mm to "10" mm.

Referring again to the chart 400, it may be noted that a change in the first distance "D1" may correspond to a change in the first target strength "S1" of the valve spring 100. In an embodiment, each turn (such as the first turn 102 or the second turn 106) of the plurality of helical turns 110 may be separated at the first distance "D1" from adjacent turns of the valve spring 100. For example, the second turn 106 may be formed as a second shape 404 and disposed at the first distance "D1" from adjacent turns of the valve spring 100, the third turn may be formed as a third shape 406 and disposed at the first distance "D1" from adjacent turns of the valve spring 100, the fourth turn may be formed as a fourth shape 408 and disposed at the first distance "D1" from adjacent turns of the valve spring 100, and a fifth turn may be formed as a fifth shape 410 and disposed at the first distance "D1" from adjacent turns of the valve spring 100.

In an embodiment, a change in the first distance "D1" may correspond to a change in the target strength "S" of the valve spring 100. For example, if the distance "D" of the first turn 102 changes from the first distance "D1" to a second distance "D2", the first target strength "S1" of the first turn 102 of the valve spring 100 may be correspondingly changed to a second target strength "S2". In an embodiment, the first target strength "S1" (or the second target strength "S2") may relate to an amount of flexibility of the valve spring 100 when assembled at a default position in the engine. Similarly, in case the first turn 102 is disposed at a third distance "D3" or a fourth distance "D4" from adjacent turns of the valve spring 100, there may be a corresponding change in the target strength "S" of the first turn 102 of the valve spring 100.

Figure 5:
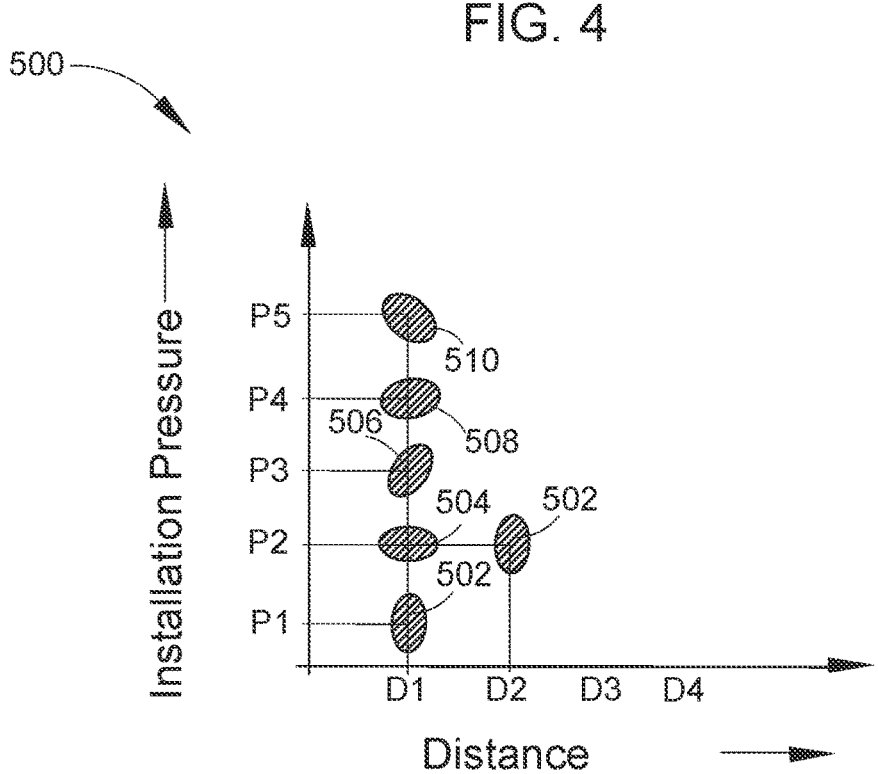
FIG. 5 is a chart that illustrates a fourth exemplary correspondence between a pressure and a distance between turns of the valve spring shown in FIGS. 1A and 1B, in accordance with an embodiment of the disclosure.

FIG. 5 is a chart that illustrates a fourth exemplary correspondence between a pressure and a distance between turns of the valve spring shown in FIGS. 1A and 1B, in accordance with an embodiment of the disclosure. FIG. 5 is explained in conjunction with elements from FIGS. 1A-1B, FIG. 2, FIG. 3, and FIG. 4. With reference to FIG. 5, there is shown a chart 500 that illustrates the fourth exemplary correspondence between an installation pressure "P" and a distance "D" between turns (such as the first turn 102 or the second turn 106) of the valve spring 100. For example, the distance "D" between turns of the valve spring 100 is depicted along the X-axis and the corresponding the installation pressure "P" of the valve spring 100 is depicted along the Y-axis.

Referring to the chart 500, there is shown a first shape 502 of the first turn 102 of the valve spring 100. The first turn 102 may be disposed at a first distance "D1". Based on the first shape 502 and the first distance "D1", the first turn 102 may be set with a first installation pressure "P1". For example, the first shape 202 may include a substantially elliptical shape and the first distance "D1" in a range from "0.1" mm to "3.0" mm. Based on the substantially elliptical shape and the first distance "D1" of the first turn 102, the first turn 102 may be set with the first installation pressure "P1". It may be noted that the first distance "D1" shown in FIG. 5 is merely an example. The first turn 102 may be disposed at any other distance, for example, at a range from 0.1 mm to 10 mm.

Referring again to the chart 500, it may be noted that a change in the first distance "D1" may correspond to a change in the first installation pressure "P1" of the valve spring 100. In an embodiment, each turn (such as the first turn 102 or the second turn 106) of the plurality of helical turns 110 may be separated at the first distance "D1" from adjacent turns of the valve spring 100. For example, the second turn 106 may be formed as a second shape 504 and disposed at the first distance "D1" from adjacent turns of the valve spring 100, the third turn may be formed as a third shape 506 and disposed at the first distance "D1" from adjacent turns of the valve spring 100, the fourth turn may be formed as a fourth shape 508 and disposed at the first distance "D1" from adjacent turns of the valve spring 100, and the fifth turn may be formed as a fifth shape 510 and disposed at the first distance "D1" from adjacent turns of the valve spring 100.

In an embodiment, a change in the first distance "D1" may correspond to a change in the first installation pressure "P1" of the valve spring 100. For example, if the distance "D" of the first turn 102 changes from the first distance "D1" to a second distance "D2", the first installation pressure "P1" of the first turn 102 of the valve spring 100 may be correspondingly changed to a second installation pressure "P2". In an embodiment, the first installation pressure "P1" (or the second installation pressure "P2") may relate to an amount of pressure set on the valve spring 100 when assembled at the default position in the engine. Similarly, in case the first turn 102 is disposed at a third distance "D3" or a fourth distance "D4" from adjacent turns of the valve spring 100, there may be a corresponding change in the installation pressure "P" of the first turn 102 of the valve spring 100.

Figure 6:
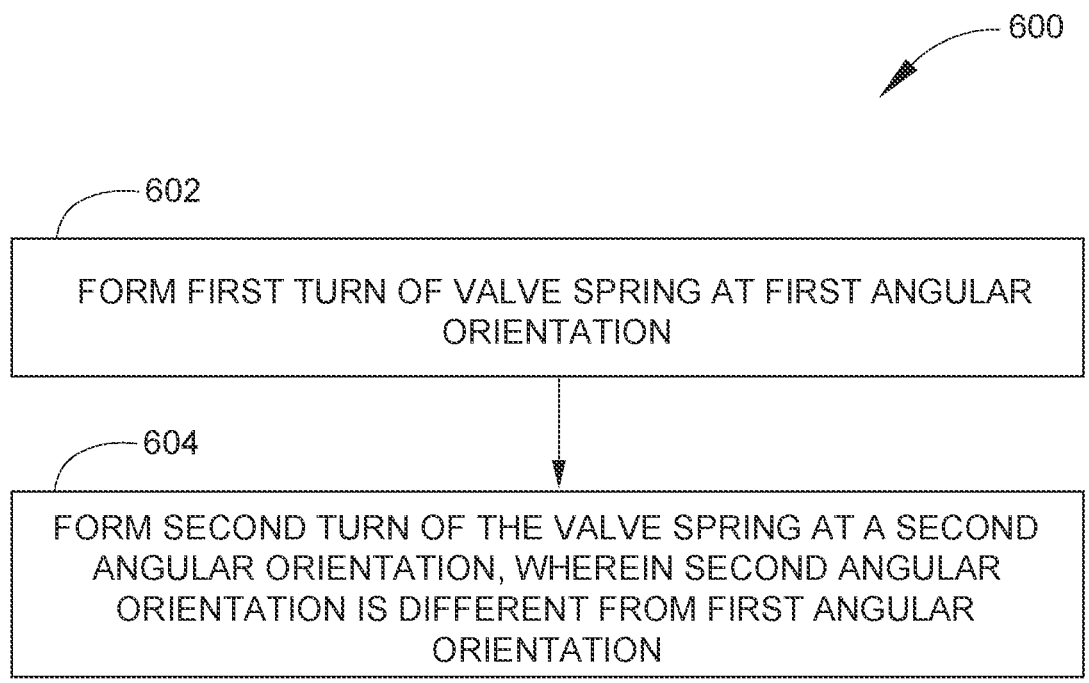
FIG. 6 is a flowchart that illustrates an exemplary method for forming the valve spring shown in FIGS. 1A and 1B, in accordance with an embodiment of the disclosure.

FIG. 6 is a flowchart that illustrates an exemplary method for forming the valve spring shown in FIGS. 1A and 1B, in accordance with an embodiment of the disclosure. FIG. 6 is explained in conjunction with elements from FIGS. 1A-1B, 2, 3, 4 and 5. With reference to FIG. 6, there is shown a flowchart 600 that depicts a method for forming the valve spring 100. The method illustrated in the flowchart 600 may start from 602.

At 602, the first turn 102 of the valve spring 100 may be formed at the first angular orientation 104. In an embodiment, based on a suitable manufacturing process (such as the cold winding process, or the hot winding process), the first turn 102 of the valve spring 100 may be formed at the first angular orientation 104, as shown in FIGS. 1, 2 and 3.

At 604, the second turn 106 of the valve spring 100 may be formed at the second angular orientation 108, which may be different from the first angular orientation 104. In an embodiment, based on a suitable manufacturing process (such as the cold winding process or the hot winding process), the second turn 106 of the valve spring 100 may be formed at the second angular orientation 108, as shown in FIGS. 1, 2, and 3. Control may pass to end.

The flowchart 600 is illustrated as discrete operations, such as 602 and 604. However, in certain embodiments, such discrete operations may be further divided into additional operations, combined into fewer operations, or eliminated, or rearranged depending on the implementation without detracting from the essence of the disclosed embodiments.

Various embodiments of the disclosure may provide a non-transitory, computer-readable medium and/or storage medium, and/or a non-transitory machine readable medium and/or storage medium stored thereon, a set of instructions executable by a machine and/or a computer (for example a Computer Numeric Control (CNC) Machine) for the production of the valve spring 100. The set of instructions may be executable by the machine and/or the computer (for example, the CNC machine) to perform operations that may include, but are not limited to, forming the first turn 102 of the valve spring 100 at the first angular orientation 104, and forming the second turn 106 of the valve spring 100 at the second angular orientation 108, which is different from the first angular orientation 104.

For the purposes of the present disclosure, expressions such as "including", "comprising", "incorporating", "consisting of", "have", "is" used to describe, and claim the present disclosure are intended to be construed in a non-exclusive manner, namely allowing for items, components or elements not explicitly described also to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible considering the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a situation or material to the teachings of the present disclosure without departing from its scope. Therefore, it is intended that the present disclosure is not limited to the embodiment disclosed, but that the present disclosure will include all embodiments that fall within the scope of the appended claims.

What is claimed is:

1. A valve spring disposed between valves and ports of an engine to control a movement of the valves of the engine, comprising:
   a first turn, wherein the first turn of the valve spring, the valve spring having an oval or elliptical cross-section, the oval or elliptical cross-section is disposed at a first angular orientation; and
   a second turn, wherein, the oval or elliptical cross-section of the second turn is disposed at a second angular orientation, wherein
   the second angular orientation is different from the first angular orientation.

2. The valve spring according to claim 1, wherein
   the first turn has a first flexibility ratio, wherein the first flexibility ratio is set based on a first shape and the first angular orientation of the first turn; and
   the second turn has a second flexibility ratio, wherein the second flexibility ratio is set based on a second shape and the second angular orientation of the second turn, and wherein the first flexibility ratio is different from the second flexibility ratio.

3. The valve spring according to claim 2, wherein the first shape of the first turn is different from the second shape of the second turn.

4. The valve spring according to claim 1, wherein
the first turn has a first flexibility ratio, wherein the first flexibility ratio is set based on a first shape and the first angular orientation of the first turn;
the second turn has a second flexibility ratio, wherein the second flexibility ratio is set based on a second shape and the second angular orientation of the second turn; and
the first flexibility ratio is same as the second flexibility ratio.

5. The valve spring according to claim 4, wherein the first shape of the first turn is same as the second shape of the second turn.

6. The valve spring according to claim 1, wherein
the second turn is located adjacent to the first turn, such that, a part of the second turn is in contact with a part of the first turn.

7. The valve spring according to claim 1, wherein
the second turn is spaced from the first turn, such that, a part of the second turn is disposed at a first distance from a part of the first turn.

8. The valve spring according to claim 7, wherein
a change in the first distance corresponds to a change in a target strength of the valve spring, and wherein the target strength relates to an amount of flexibility of the valve spring when assembled at a default position in an engine.

9. The valve spring according to claim 7, wherein
a change in the first distance corresponds to a change in an installation pressure of the valve spring, and wherein
the installation pressure relates an amount of pressure set on the valve spring when assembled at a default position in an engine.

10. The valve spring according to claim 1, wherein
the first turn has a first dimension;
the second turn has a second dimension; and
the second dimension is substantially same as the first dimension.

11. The valve spring according to claim 1, wherein
the first turn has a first flexibility ratio, wherein the first flexibility ratio is set based on the first angular orientation of the first turn; and
the second turn has a second flexibility ratio, wherein the second flexibility ratio is set based on the second angular orientation of the second turn, and wherein the first flexibility ratio is different from the second flexibility ratio.

12. The valve spring according to claim 1,
wherein the first turn and the second turn of the valve spring is helically wounded along a first axis.

13. The valve spring according to claim 1, wherein the valve spring has an outside diameter in a range from 10 mm to 50 mm.

14. The valve spring according to claim 1, wherein the valve spring has a wire diameter in a range from 1.5 mm to 5 mm.

15. A valve spring disposed between valves and ports of an engine to control a movement of the valves of the engine, the valve spring having an oval or elliptical cross-section, the oval or elliptical cross-section, comprising:
a plurality of helical turns comprising a first turn and a second turn, wherein the oval or elliptical cross-section of the first turn is disposed at a first angular orientation and the oval or elliptical cross-section of the second turn is disposed at a second angular orientation, wherein
the second angular orientation is different from the first angular orientation.

16. The valve spring according to claim 15, wherein
the first turn has a first flexibility ratio, wherein the first flexibility ratio is set based on the first angular orientation of the first turn; and
the second turn has a second flexibility ratio, wherein the second flexibility ratio is set based on the second angular orientation of the second turn, and wherein the first flexibility ratio is different from the second flexibility ratio.

17. The valve spring according to claim 15, wherein each turn of the plurality of helical turns is sequentially arranged as a plurality of individual groups to form a pattern, wherein
a first set of turns of the plurality of helical turns forms a first group, wherein each turn of the first group is separated by a first distance; and
a second set of turns of the plurality of helical turns forms a second group, wherein each turn of the second group is separated by a second distance, and wherein, the first distance is different from the second distance.

18. The valve spring according to claim 15, wherein each turn of the plurality of helical turns are separated at a first distance,
a change in the first distance corresponds to a change in a target strength of the valve spring, and
the target strength relates to an amount of flexibility of the valve spring when assembled at a default position in an engine.

19. A method of forming valve spring disposed between valves and ports of an engine to control a movement of the valves of the engine, the valve spring having an oval or elliptical cross-section, the oval or elliptical cross-section, comprising:
forming a first turn of the valve spring at a first angular orientation of the oval or elliptical cross-section; and
forming a second turn of the valve spring at a second angular orientation of the oval or elliptical cross-section, the second angular orientation is different from the first angular orientation, wherein a part of the second turn is in contact with a part of the first turn.

* * * * *